Patented Apr. 25, 1933

1,906,166

UNITED STATES PATENT OFFICE

OTTO LIEBKNECHT, OF NEUBABELSBERG, GERMANY, ASSIGNOR TO THE PERMUTIT COMPANY, OF NEW YORK, N. Y., A CORPORATION OF DELAWARE

RECOVERING BASE EXCHANGE MATERIAL

No Drawing. Application filed January 12, 1931, Serial No. 508,379, and in Germany January 25, 1930.

This invention relates to recovering base exchange material; and it comprises an improvement in methods of producing dry alkali alumino-silicate gels for water softening and other purposes by making the wet gels, drying, washing and granulating wherein fines resulting from drying and granulation are gelatinized by an alkali or an acid treatment and returned for incorporation in said wet gels being generally before gelatinization ground to produce a fine uniform material, all as more fully hereinafter set forth and as claimed.

In the production of granular base exchange materials or artificial zeolites by the usual wet methods various solutions are mixed to produce reaction products in the form of jellies or other gels; the wet gels being then pressed, dried, washed, granulated and again dried. In washing, the dry material usually disintegrates and produces granules. This granulation may be sufficient; or there may be an additional mechanical comminution. In either event, there are produced fines; that is material too fine for use as the granules of a pervious bed softener. Fines are also produced in the drying operation. This fine material has been regarded as waste and it may amount to 10 to 30 per cent of the whole product. In some cases the waste may be less than 10 per cent but often it is higher. Many propositions have been made looking toward disposition of this waste material; but no good use has been found.

It has now been found that this fine material, further ground to give even comminution, can be usefully returned in the process. In so doing there is not only a utilization of a waste material but the final product, the dry commercial, granulated material is physically improved. Return may be in several ways. In one, the fine ground material is suspended or dispersed in one of the alkaline solutions, such for example as the alkali silicate solution to be used in forming the wet gel. So doing, the fine solid zeolite particles become disintegrated into swollen and slimy superficially gelatinized particles and later form an integral part of the gel. It is sometimes advantageous to treat the fines for a short time with an alkali solution such as caustic soda, thereby disintegrating and gelatinizing the fine particles, and then to disperse the gelatinized particles in the gel-forming solution. In some cases it is advantageous to gelatinize the fine zeolite particles by an acid treatment and then to add the gelatinized zeolite to the gel-forming solution mixture. In another way of returning, the fine ground material after either alkali or acid treatment is physically mixed or kneaded with a pulped gel. In any case, the wet gel containing the distributed fine ground zeolite is dried, washed and granulated in the usual manner. The granulated product is substantially homogeneous. The return of the waste fines as described, besides being economical, improves the product by increasing its physical ruggedness. The incorporation of fines with the wet gel decreases the tendency to produce fines in drying and granulating.

In some cases the fines resulting from the various operations are sufficiently finely divided and uniform to be directly returned. In most cases, however, it is expedient to subject the fines to further comminution with production of a uniform fine grained material; often of impalpable fineness. The fines may be dried and then ground in any suitable commercial milling device.

The present invention is applicable to the production of base exchange materials from wet zeolite gels made in any of the ways usual in the art, as by precipitating silicate solutions with aluminum sulfate solutions or with sodium aluminate solutions. When aluminum sulfate is used, it is advantageous to disperse acid treated zeolite fines in the aluminum sulfate solution before its mixture with the silicate solution. The invention is also applicable in producing dry commercial gels for other purposes than water softening and in the production of such gels not containing silica. For various purposes dry gels are made containing iron oxid, titanium oxid, tin oxid, zirconium oxid, chromium oxid, magnesia, etc. The present process is applicable in producing these gels.

In making dry gels by the present invention a product is produced which comprises an intimate mixture compounded of two gels of different ages, one of the gels being dried, washed, granulated and sometimes pulverized and then incorporated in another gel with or without preliminary acid or alkali treatment. It is sometimes desirable to incorporate the fine particles of an older gel of one kind in a newer gel of another kind. For example, the fine particles of a previously formed sodium silicate-aluminum sulfate gel may be stirred into a mixture of sodium silicate and sodium aluminate solutions before, during or after gelation. A gel made in this way has, after drying and finishing, desirable physical properties for water softening purposes.

What I claim is:

1. In the manufacture of dry granular zeolite gels by interaction of solutions of alkali silicates and of alumina compounds to form wet zeolite gels, drying, washing and granulating, the method of utilizing the waste fines produced in said operations which comprises gelatinizing the fines by treatment with an alkali solution and incorporating the gelatinized fines with the gel-forming solutions.

2. In the manufacture of dry granular zeolite gels by interaction of solutions of alkali silicates and of aluminum compounds to form wet zeolite gels, drying, washing and granulating, the improvement which comprises superficially gelatinizing the particles of fines produced in said operations and kneading the gelatinized fines into the wet gels.

3. In making base exchange silica gels, the process which comprises incorporating in a wet gel gelatinized fine particles of a previously formed and dried gel and then drying and granulating the gel mixture.

4. In the manufacture of dry granular zeolite gels by interaction of solutions of alkali silicates and of alumina compounds to form wet gels, drying, washing and granulating, the improvement which comprises returning fines produced in said operations to the process by gelatinizing the fines and incorporating the gelatinized fines in the wet gel.

5. In the process of claim 2, the step which comprises fine grinding the dry fines before gelatinizing.

6. In the manufacture of dry granular zeolite gels by interaction of solutions of alkali silicates and of alumina compounds to form wet zeolite gels, drying, washing and granulating, the method of utilizing the waste fines produced in said operations which comprises gelatinizing the fines by treatment with an acid and incorporating the gelatinized fines with the gel-forming solutions.

In testimony whereof I affix my signature.

OTTO LIEBKNECHT.

CERTIFICATE OF CORRECTION.

Patent No. 1,906,166.  April 25, 1933.

OTTO LIEBKNECHT.

It is hereby certified that error appears in the printed specification of the above numbered patent requiring correction as follows: Page 2, line 42, claim 2, for "aluminum" read "alumina"; and line 49, claim 3, for "silica" read "silicate"; and that the said Letters Patent should be read with these corrections therein that the same may conform to the record of the case in the Patent Office.

Signed and sealed this 30th day of May, A. D. 1933.

M. J. Moore.

(Seal)  Acting Commissioner of Patents.